(12) United States Patent
Sapire

(10) Patent No.: US 12,022,975 B2
(45) Date of Patent: Jul. 2, 2024

(54) BLENDER CONTAINER WITH LATCH RELEASE

(71) Applicant: Capbran Holdings, LLC, Los Angeles, CA (US)

(72) Inventor: Colin Sapire, Los Angeles, CA (US)

(73) Assignee: CAPBRAN HOLDINGS, LLC, Los Angeles, CA (US)

( * ) Notice: Subject to any disclaimer, the term of this patent is extended or adjusted under 35 U.S.C. 154(b) by 821 days.

(21) Appl. No.: 17/150,024

(22) Filed: Jan. 15, 2021

(65) Prior Publication Data

US 2021/0127893 A1     May 6, 2021

Related U.S. Application Data

(63) Continuation of application No. 16/022,592, filed on Jun. 28, 2018, now Pat. No. 10,893,775.

(60) Provisional application No. 62/527,945, filed on Jun. 30, 2017.

(51) Int. Cl.
| | |
|---|---|
| *A47J 36/10* | (2006.01) |
| *A47J 43/042* | (2006.01) |
| *A47J 43/046* | (2006.01) |
| *A47J 43/07* | (2006.01) |
| *A47J 43/08* | (2006.01) |

(52) U.S. Cl.
CPC ............ *A47J 36/10* (2013.01); *A47J 43/042* (2013.01); *A47J 43/046* (2013.01); *A47J 43/0722* (2013.01); *A47J 43/0761* (2013.01); *A47J 43/085* (2013.01); *A47J 43/075* (2013.01); *A47J 43/0766* (2013.01); *A47J 43/0772* (2013.01); *A47J 43/0777* (2013.01)

(58) Field of Classification Search
CPC ........ A47J 36/10; A47J 43/042; A47J 43/046; A47J 43/0722; A47J 43/0761; A47J 43/085; A47J 43/075; A47J 43/0766; A47J 43/0772; A47J 43/0777; A47J 44/00; B02C 23/00
See application file for complete search history.

(56) References Cited

U.S. PATENT DOCUMENTS

| | | | | |
|---|---|---|---|---|
| 3,315,946 | A * | 4/1967 | Nissman | ............... A47J 43/046 366/205 |
| 3,843,006 | A | 10/1974 | Naito et al. | |
| 4,512,484 | A | 4/1985 | Mar | |
| 5,544,573 | A | 8/1996 | Gateaud | |
| 5,603,421 | A | 2/1997 | Opresco | |
| 6,748,630 | B2 | 6/2004 | Livingston | |
| 8,333,288 | B2 | 12/2012 | Miller et al. | |
| 9,955,820 | B2 * | 5/2018 | Law | ..................... A47J 43/0716 |
| 11,779,159 | B2 * | 10/2023 | LePori | ................. A47J 43/0761 241/292.1 |
| 2016/0287017 | A1 * | 10/2016 | Law | ..................... A47J 43/0716 |
| 2017/0340170 | A1 * | 11/2017 | Brunner | ............. B65D 81/2038 |
| 2018/0008098 | A1 * | 1/2018 | Koscak | ................ A47J 43/0716 |
| 2019/0000273 | A1 * | 1/2019 | Sapire | .................... A47J 43/085 |

(Continued)

*Primary Examiner* — Charles Cooley
(74) *Attorney, Agent, or Firm* — Trojan Law Offices

(57) ABSTRACT

A system for attaching a blender container to a blade assembly, which comprises a first mechanism to secure a blender container to a blade assembly. Some embodiments of the system include a second latch mechanism to lock the blender container to the blade assembly while the container and blade assembly are mounted to a base for operation of the blender.

13 Claims, 9 Drawing Sheets

(56) References Cited

U.S. PATENT DOCUMENTS

| | | | |
|---|---|---|---|
| 2019/0000275 A1* | 1/2019 | Sapire | A47J 43/046 |
| 2021/0007557 A1* | 1/2021 | LePori | A47J 43/075 |
| 2021/0127893 A1* | 5/2021 | Sapire | A47J 43/085 |
| 2021/0354100 A1* | 11/2021 | Sapire | A47J 43/046 |

* cited by examiner

BLENDER CONTAINER WITH LATCH RELEASE

CROSS-REFERENCE TO RELATED APPLICATIONS

The application claims priority to and benefit of and U.S. patent application Ser. No. 16/022,592 (to be issued as U.S. Pat. No. 10,893,775 on Jan. 19, 2021), which claims priority to and benefit of U.S. Provisional Patent Application No. 62/527,945, filed on Jun. 30, 2017, the content of which is incorporated by reference in its entirety.

FIELD OF THE INVENTION

The present invention relates to containers having a latch release, and more particularly, to a latch mechanism for blenders and food processors.

BACKGROUND OF THE INVENTION

Kitchen appliances such as blenders and food processors are well known. Such devices are typically comprised of a container, a blade assembly, and a motor base. For instance, a typical countertop blender will have a container with a blade assembly that can be mounted on a base having a motor for powering the various operations of the blender.

In a typical countertop blender, the container will have an opening to receive food or liquid to be processed by the blade assembly. For "upright" or "traditional" blenders, the container has a top opening that is enclosed by a lid, with the blade assembly integrally affixed to the bottom of the container such that the blade assembly is mounted to the base with the container in an upright position. For "inverted" or "single serve" blenders, the blade assembly is removably attached to the opening of the container so that it also functions as a lid, such that the container is inverted to mount the blade assembly to the base.

In both upright and inverted blenders, it is critical to properly close the container during operation to prevent spillage of the contents, and also to prevent exposure to the spinning blades of the blade assembly. Because the blades are sharp and spin at a very high speed, there is the potential for serious injury to the user if the container were to open during operation or otherwise become dislodged from the blade assembly during operation. This danger is particularly hazardous with inverted blenders because the blade assembly is not integrally affixed to the container. In inverted blenders, the blade assembly is designed to be removably attached to the container. As such, if the container separates from the blade assembly during operation, this would create an extreme hazard because the whirling blades would be exposed and a user could suffer severe injury if he or she makes contact with the spinning blades. Thus, it is necessary that the attachment between the blade assembly and the container be secure in inverted blenders.

To securely attach the blade assembly to the container in inverted blenders, it is the current practice to attach the blade assembly to the container using conventional helical threads, commonly known as screw threads. For example, a blade assembly would have male or female threads and a container would have complementary female or male threads. The blade assembly is attached to the container by threading it onto the container and rotating it until tightly sealed. Because the helical threads wrap around a container or a blade assembly for several revolutions, it is often necessary to turn the blade assembly several revolutions until it is completely secured to the container.

The use of conventional threads to attach the blade assembly and the container can be disadvantageous for several reasons. First, molding screw threads on both the container and the blade assembly can be difficult and expensive based on current manufacturing methods. Techniques for molding long, thin threads are complex. Because of the difficulty of molding threads, the costs of manufacturing containers and blade assemblies having threads can be expensive.

Second, in addition to such manufacturing challenges, the molds for the threads for the containers and blade assemblies can wear down over time through countless cycles of use. The need to reproduce these manufacturing molds can also be expensive.

Lastly, the use of threads can be inconvenient because it can be difficult to twist on and off the blade assembly with the container. Since it is necessary to turn the blade assembly several revolutions to tightly seal the blade assembly to the container, the use of threads can make it difficult to attach the blade assembly to the container and can make it difficult to detach the blade assembly from the container. To detach the blade assembly from the container, it is necessary to untwist the blade assembly, which can be especially difficult if the threads are tightly attached or if the user's hands are wet. For these reasons, it is desirable to provide a means of securely attaching a blade assembly to a container without the use of threads.

To attach a blade assembly to a container without using conventional threads, it is necessary to meet several objectives. Critically, the blade assembly has to be securely attached to the container to ensure safe operation of the blender. The attachment not only has to be secure, but the blade assembly and the container have to form a sufficiently tight seal to prevent any leaking when the container is inverted and mounted on the base. At the same time, however, it is important that the blade assembly and the container be easily attached and detached.

To meet all of these objectives, it is desirable to provide a latch mechanism to secure the blade assembly to the container for inverted blenders. The latch mechanism can also be used to secure a lid to the container for upright blenders.

Latch mechanisms are used on a variety of containers, such as medicine bottles, to prevent access by young children. For example, U.S. Pat. No. 4,512,484 to Mar describes a locking screw cap for medicine bottles. The Mar patent describes a locking pin mounted in a bracket on the cap, which can be depressed to engage one or more lugs to prevent rotation of the cap. A flange formed on the top of the locking pin and a tang formed in the middle of the locking pin prevent removal of the pin from the bracket. The pin is raised by inserting a fingernail in a slot formed in the tang to urge the pin upward.

U.S. Pat. No. 5,544,573 to Gateund et al. describes a latch for locking a mixing bowl on the motor support for a food processor. According to the invention, the latch is hinged to the handle of the bowl and serves to penetrate through a slot into a channel that includes a locking surface. When the latch is depressed, it pivots to unlock a protrusion from the motor base to allow the rotation of the mixing bowl.

Similarly, U.S. Pat. No. 5,603,421 to Opresso describes a safety cap having winged fingerpieces with latching members. The fingerpieces provide a hinge-up release movement of the latching members when the fingerpieces are squeezed radially inward.

U.S. Pat. No. 8,333,288 to Miller et al. describes a cap with a separate locking ring. The locking ring is provided with diametrically opposed squeeze tabs that extend through openings in the cap and locking detents that fit into openings in the container to lock the cap onto the container. To open the container the user simultaneously squeezes the squeeze tabs while lifting and rotating the cap.

However, none of these locking mechanisms are appropriate for use with blenders and food processors. These locking mechanisms generally rely on a "key" that inserts into a recess to lock a cap onto a container. They are generally designed to prevent children from gaining access to medicine bottles or other types of containers containing potentially hazardous content. As such, they are intentionally designed to be difficult to release the cap from the container, which makes such latches unsuitable for uses where it is desirable to easily undo the cap without sacrificing safety.

It is an object of the invention to provide a means for securely attaching a blade assembly to a container for use with blenders and food processors.

It is an object of the invention to provide a means for securely attaching a blade assembly to a container without the use of conventional helical threads.

It is an object of the invention to provide a threadless means for quickly and conveniently attaching and detaching a blade assembly with a container.

It is an object of the invention to provide a threadless means for securely attaching a blade assembly to a container that forms a sufficiently tight seal to prevent any leaking.

It is an object of the invention to provide a latch mechanism that enables a progressively tighter seal in which the blade assembly can be secured to the container in a first secure position, then secured in a second secure position that is more secure than the first secure position, and then secured in a third secure position that is more secure than the second secure position.

It is a further object of the invention that the latch mechanism can provide audible feedback to the user, such as a "click" such that the user can be informed of the level of tightness of the attachment.

If is a further object of the invention to provide a latch mechanism that can be tightened in one direction and removed when turned in the opposite direction.

SUMMARY OF THE INVENTION

In accordance with the objectives of the invention, the embodiments of the present invention relate to a blender. A blender is to be understood as any device capable of processing foods, drinks, or any comestible material. The blender according to the present invention is comprised of a container, a blade assembly, and a motor base. The container has an open-end for receiving the comestible material to be processed. The blade assembly is removably attachable to the open-end of the container. When the blade assembly is attached to the container, the blade assembly (with the container attached) is mounted onto the base to perform the processing operations.

The blade assembly is comprised of a blade or blades mounted on a blade holder. The blade is connected to a blade impeller, which functions to drive the blade. The blade holder has an interior surface that fits in the container when the blade assembly is attached to the open-end of the container. The interior surface of the blade holder connects with a collar and with a trench formed between the interior surface and the collar. When the blade assembly is attached to the open-end of the container, the rim of the open-end rests in the trench to form a tight seal between the blade assembly and the container.

The blade assembly further has at least one slot on the interior surface. Correspondingly, the container has at least one tongue protrusion for engaging with the slot. The blade assembly attaches to the open-end of the container by inserting the tongue protrusion into the slot and rotating the blade assembly until the tongue protrusion is securely engaged in the slot.

The blade assembly has a latch for locking the blade assembly to the container once the tongue protrusion is securely engaged with the slot. The latch is comprised of a button that is located on the collar of the blade holder. The latch is spring-mounted such that when the button is pushed, it pivots to an open position. The latch will return to the closed position when the button is no longer manually depressed by the user. The latch has a notch, or preferably a series of notches, configured to engage with a locking rib on the container. When the blade assembly is attached to the container such that the tongue protrusion is fully engaged with the terminal side of the slot, the notch of the latch is engaged with the locking rib on the container to prevent the blade assembly from being rotated to detach the blade assembly from the container. To detach the blade assembly from the container, it is necessary to depress the button to release the locking rib from the notch so that the blade assembly can be rotated to detach it from the container. In short, the latch functions to lock the blade assembly to the container.

When the blade assembly is securely attached to the container, the blade assembly is mounted on the base, which has a motor for operating the blender. The motor is connected to a motor impeller. The blade assembly is mounted on the base by engaging the blade impeller of the blade assembly with the motor impeller of the base such that the motor drives the impellers to drive the blade.

The base has a safety mechanism to prevent the latch from being opened while the blade assembly is mounted on the base. The safety mechanism is comprised of a protrusion located on the base that blocks the latch when the blade assembly is mounted on the base. The protrusion prevents the latch from being depressed to release the locking rib when the container and the blade assembly are mounted to the base. Thus, the latch cannot pivot into the open position to release the locking rib of the container. Since the latch is locked at all times while the blade assembly is mounted on the base, the container is thus locked to the blade assembly so that it cannot accidentally detach from the blade assembly while the blender is in operation. Hence, as long as the latch's notch is engaged with the locking rib, the container will always be securely locked to the blade assembly during operation of the blender.

DETAILED DESCRIPTION OF EMBODIMENTS

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
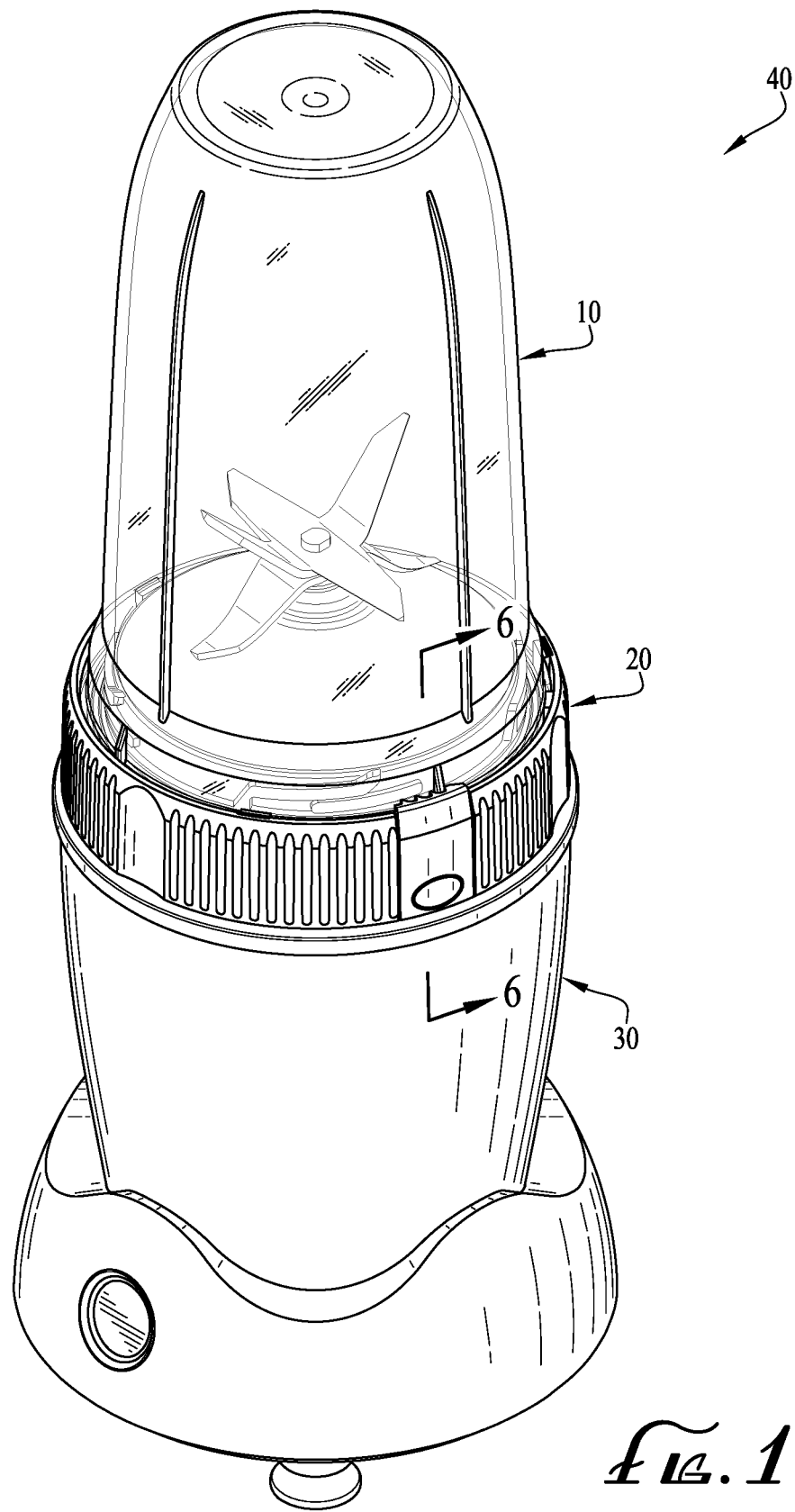
FIG. 1 is a perspective view of a blender in accordance with an embodiment of the present invention.

FIG. 1 illustrates a perspective view of blender 40 according to an embodiment of the invention. The blender 40 is comprised of a container 10, a blade assembly 20, and a base 30. As shown in the exploded view of FIG. 2, the blade assembly 20 is removably attachable to the container 10 to form a closed space for processing comestible material. The container 10 with the blade assembly 20 is removably attachable to the base 30.

Figure 2:
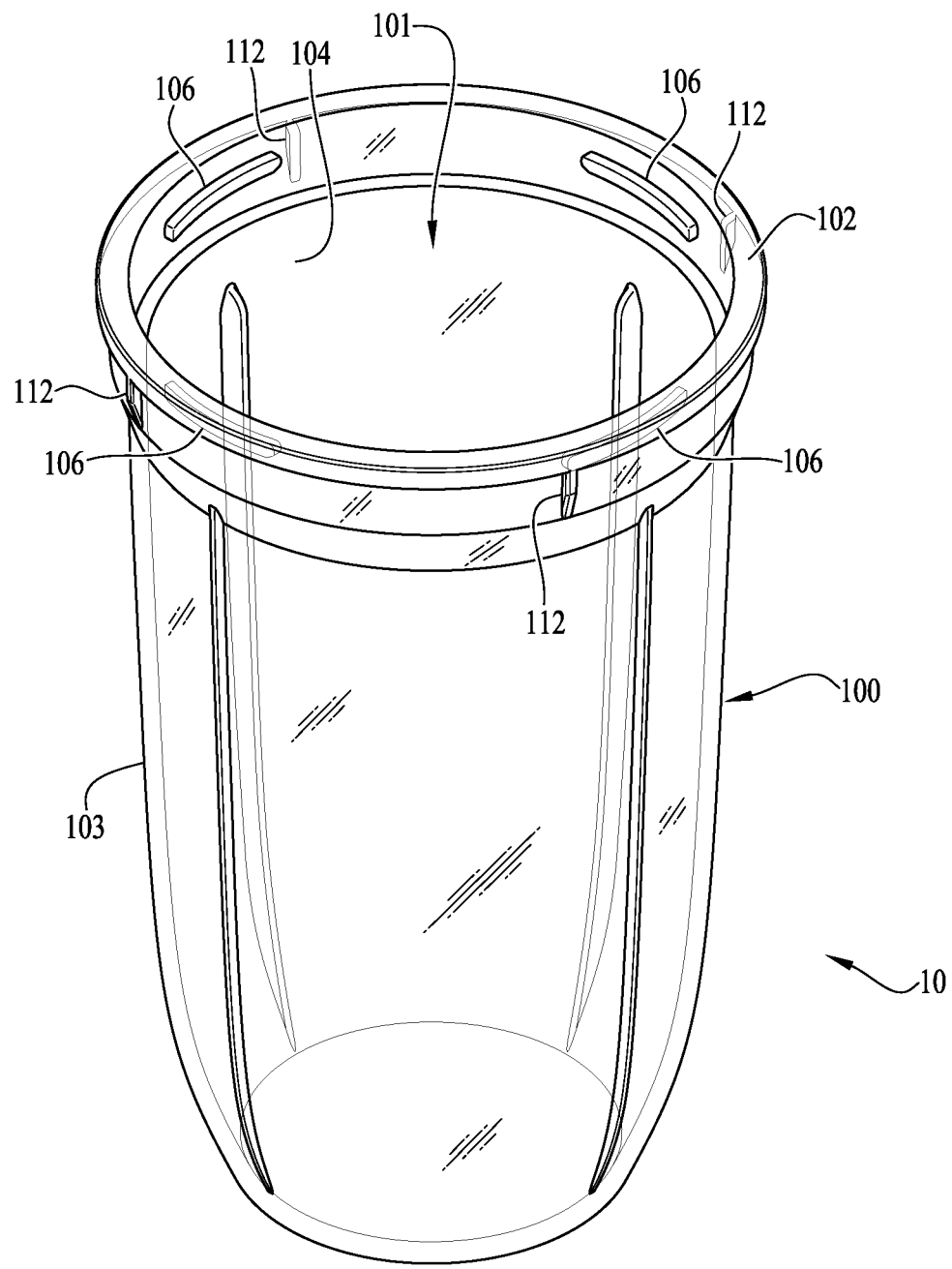
FIG. 2 is an exploded view of the blender in accordance with an embodiment of the present invention

Referring now to FIG. 2, the container 10 has a body 100 with an open-end 101 that is defined by a rim 102. In a preferred embodiment, the body 100 is ogive shaped (i.e. bullet shaped), though it can have any shape that would serve the intended function of the invention. The body 100 is further defined by an outer side 103 and an inner side 104. The container 10 has one or more tongue protrusions 106 located on the inner side 104 near the rim 102 to facilitate the attachment of the container 10 to the blade assembly 20. To further secure the attachment of the container 10 to the blade assembly 20, the container 10 also has a plurality of locking ribs 112 located on the outer side 103 proximate to said open-end 101.

Figure 3:
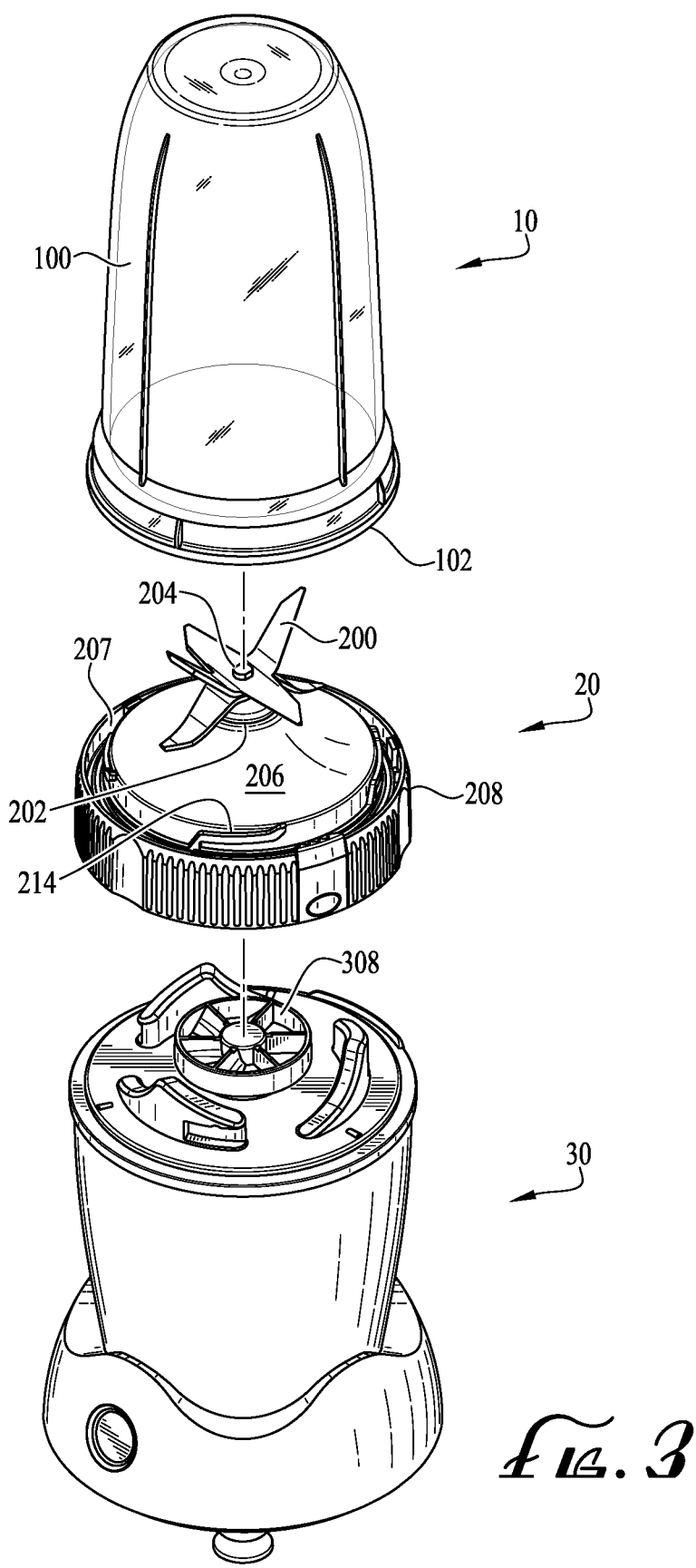
FIG. 3 is a perspective view of a container of the blender in accordance with an embodiment of the present invention.
Figure 4:
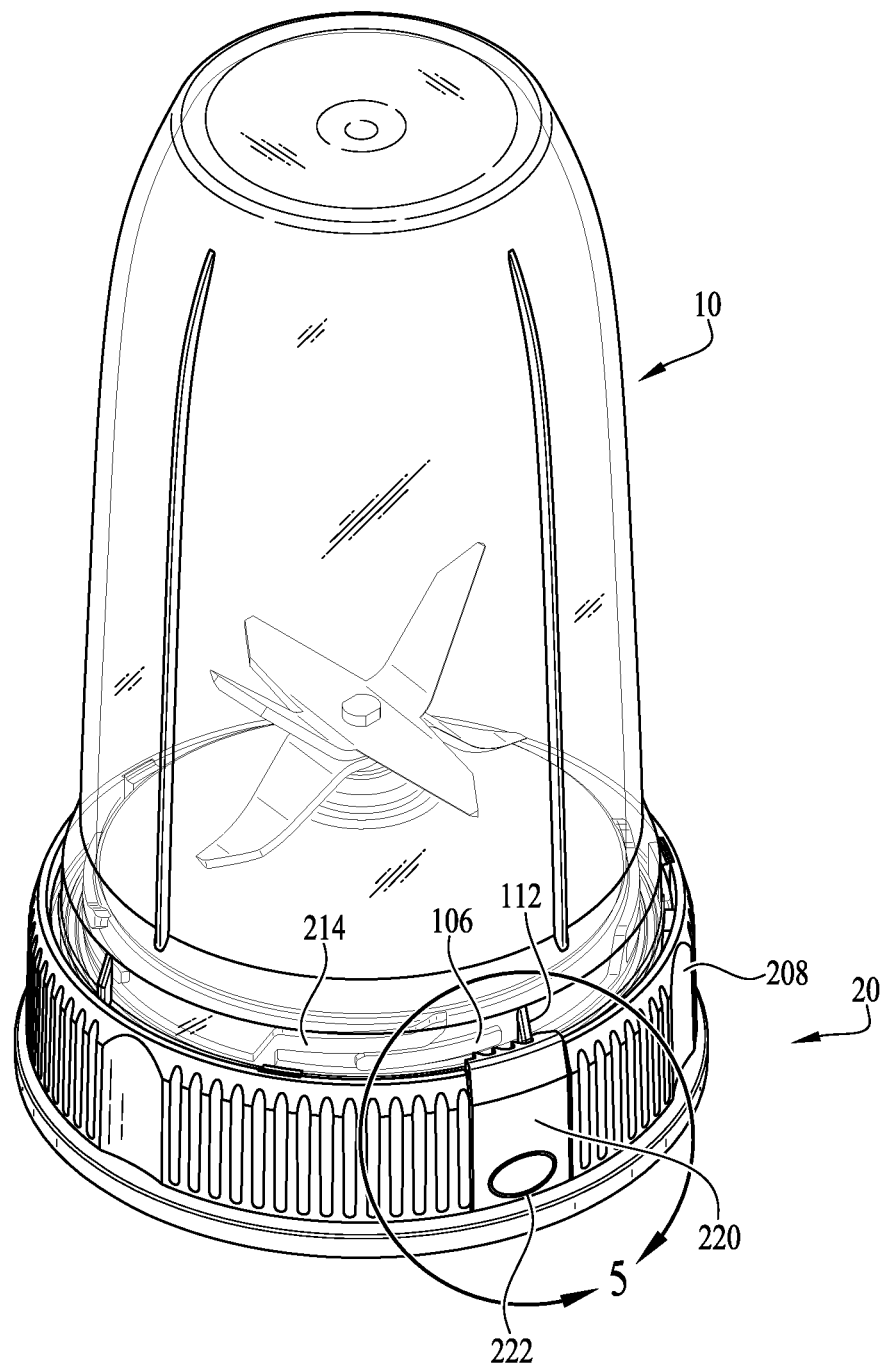
FIG. 4 is a perspective view of a container of the blender that is attached to the blade assembly in accordance with an embodiment of the present invention.

Referring now to FIG. 3, the blade assembly 20 is comprised of a blade 200 and a blade holder 202. The blade 200 is mounted on the blade holder 202 and connected to the blade impeller 204 such that the blade impeller 204 operates to spin the blade 200. The blade holder 202 has an interior surface 206 connected to a collar 208, forming a trench 207 between the interior surface 206 and the collar 208. The shape and size of the collar 208 is complementary to the shape and size of the rim 102 of the container 10 such that the rim 102 fits within the collar 208 to seal the open-end 101 when the blade assembly 20 is attached to the container 10 as shown in FIG. 4. When the blade assembly 20 is attached to the container 10 the interior surface 206 is inside the container 10.

As further shown in FIG. 3 and FIG. 4, the blade assembly 20 has one or more slots 214 on the interior surface 206 of the blade holder 202. The container 10 is affixed to the blade assembly 20 by engaging the tongue protrusions 106 with the slots 214. In a preferred embodiment, the container 10 is attached to the blade assembly 20 by inserting the tongue protrusions 106 into the slots 214 and rotating the blade assembly 20 in a forward direction relative to the container 10 until the tongue protrusions 106 slide into the slots 214. It is to be understood that the "forward direction" is the direction of rotation to slide the tongue protrusions 106 into the slots 214 for attaching the blade assembly 20 to the container 10.

Conversely, a "reverse direction" is the opposite direction of rotation to slide the tongue protrusions 106 out of the slots 214 for detaching the blade assembly 20 from the container 10. Because the of length the tongue protrusions 106 is short, generally about an inch in a preferred embodiment, the degree of rotation in either directions to attach and detach the blade assembly 20 with the container 10 is correspondingly small. Hence, the blade assembly 20 can be easily and quickly attached and detached with the container 10.

The blade assembly 20 forms a seal with the container 10. When the tongue protrusions 106 are secured in the slots 214, the rim 102 of the container rests in trench 207 between the interior surface 206 and the collar 208 to seal the open-end 101 of the container 10. This prevents leaking between the blade assembly 20 and the container 10.

Figure 5:
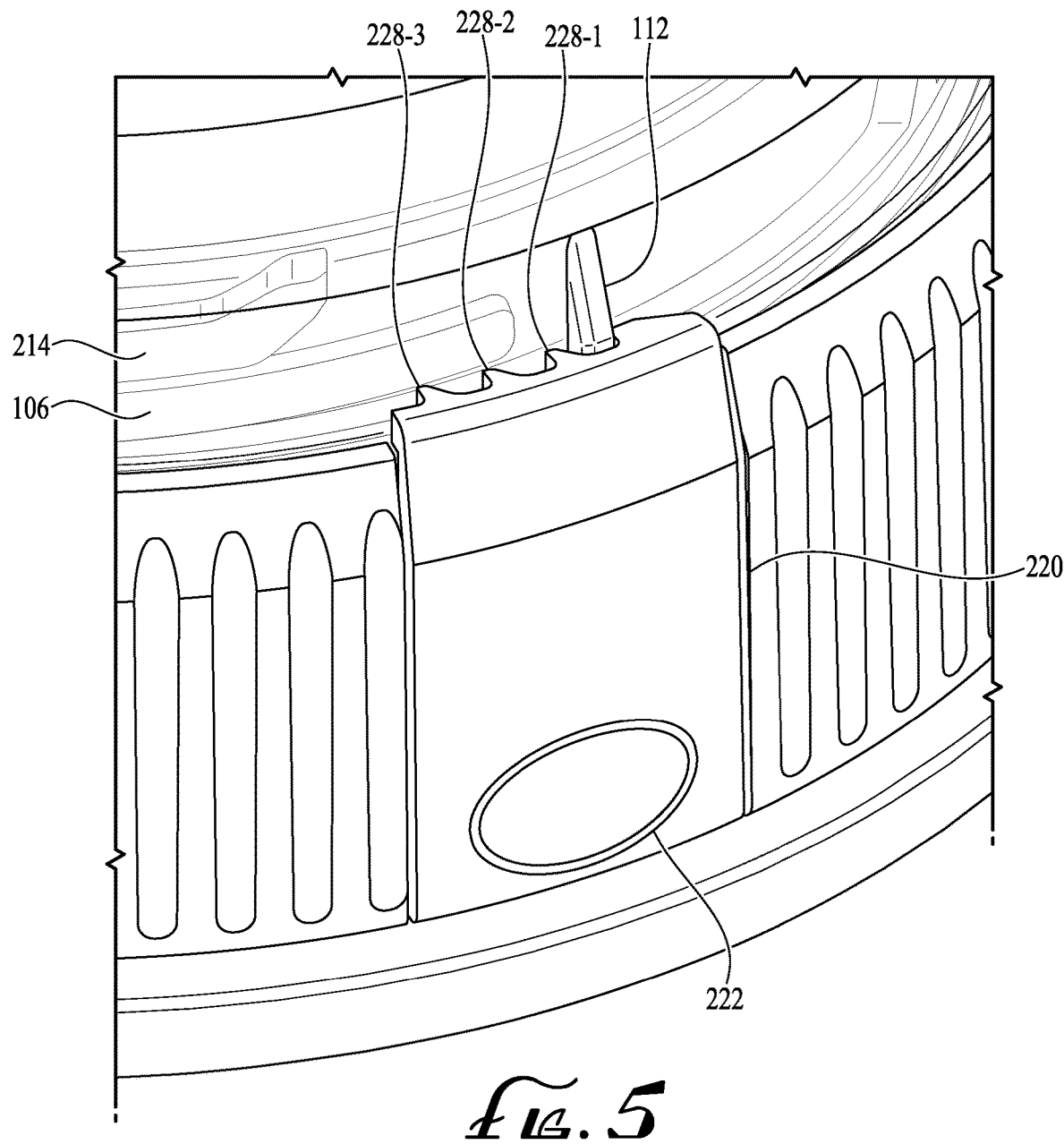
FIG. 5 is a bottom perspective view of the latch assembly in accordance with an embodiment of the present invention.

The blade assembly 20 further has a latch 220 for locking the blade assembly 20 with the container 10. In a preferred embodiment as shown in FIG. 4 and FIG. 5, the latch 220 has a button 222 and an arm 224.

Figure 6:
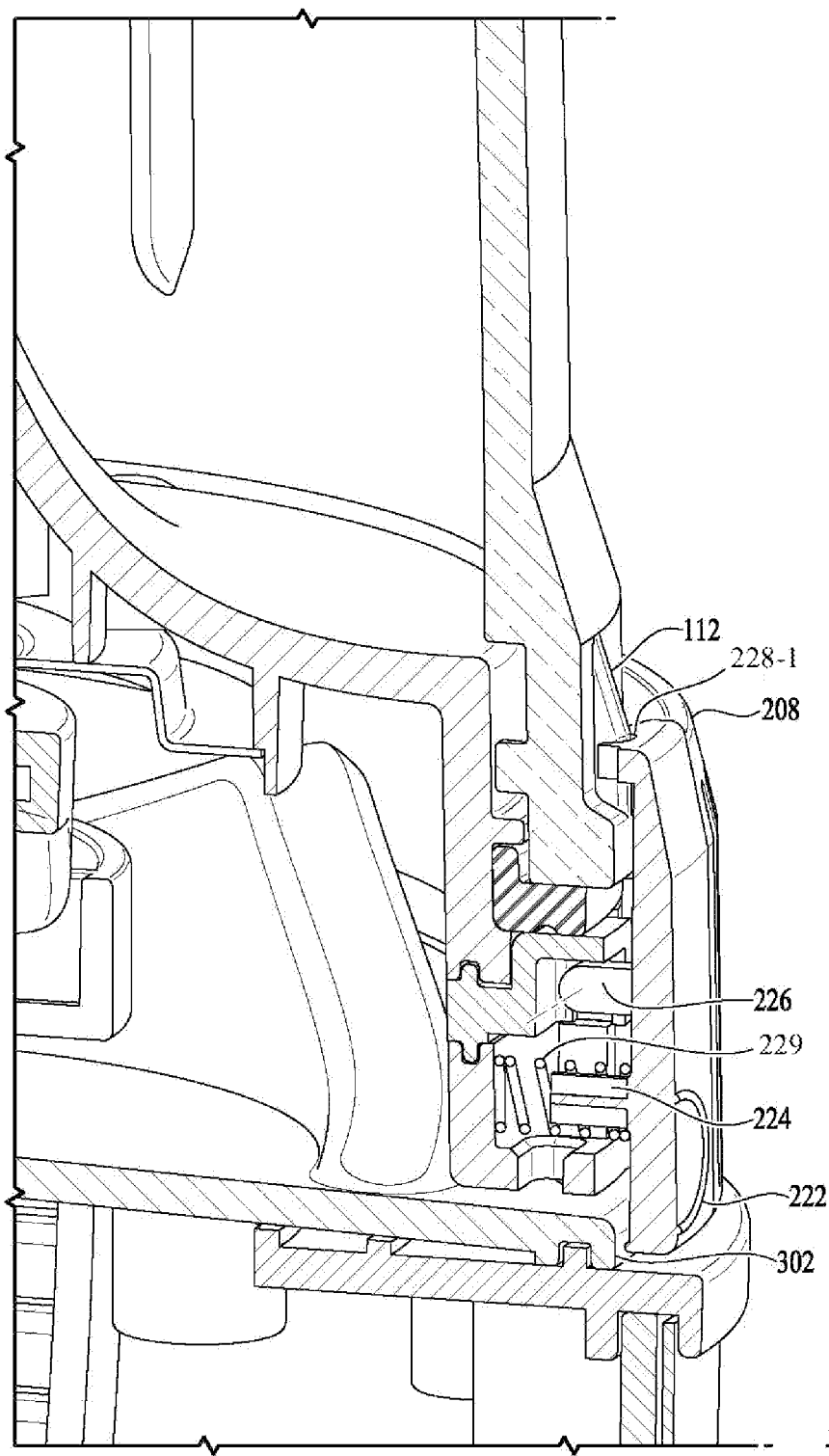
FIG. 6 is a cross section of the latch assembly as the container of the blender is attached to the blade assembly and mounted to the base in accordance with an embodiment of the present invention.
Figure 7:
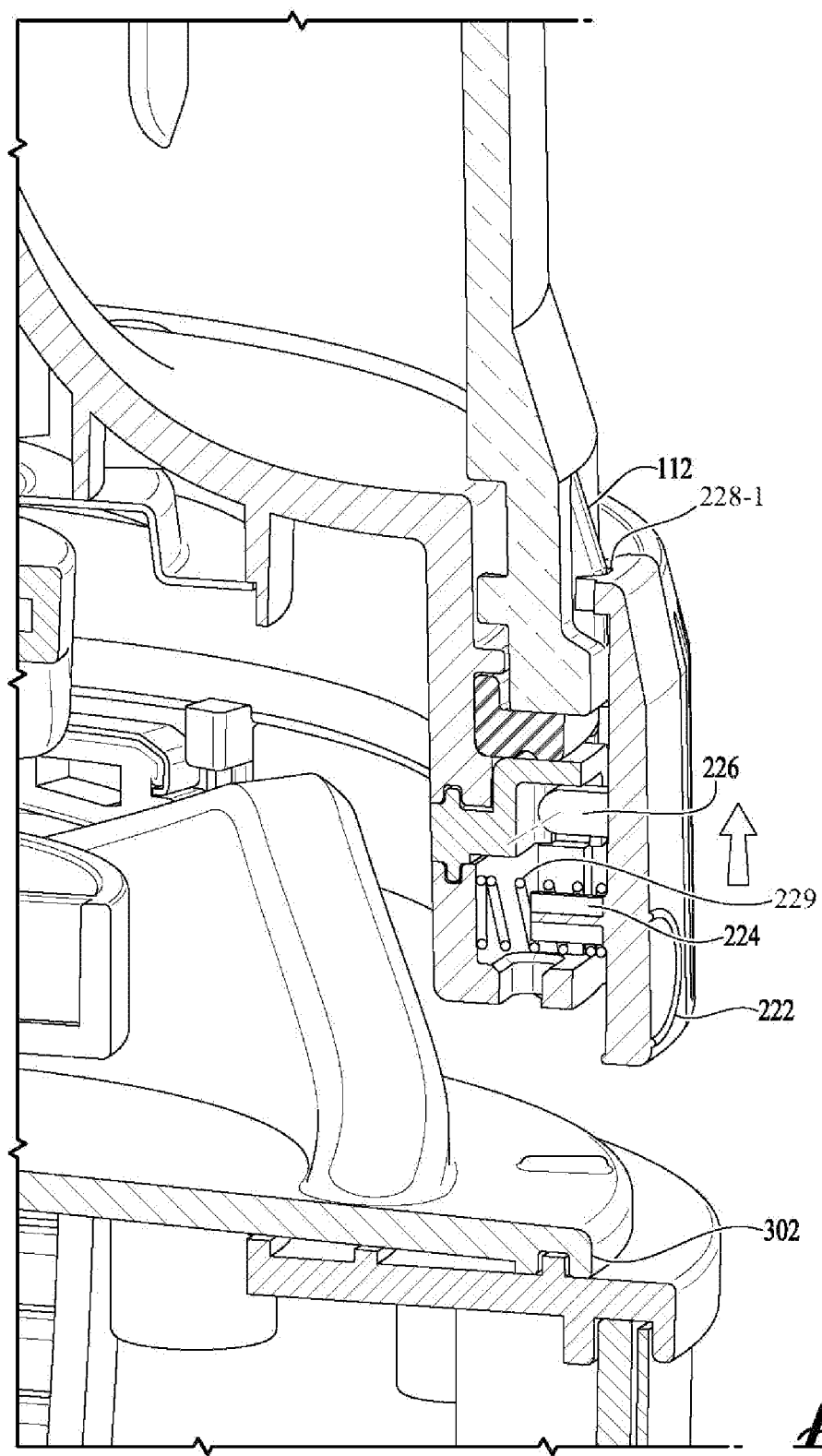
FIG. 7 is a cross section of the latch assembly as the container of the blender is attached to the blade assembly and removed from the base in accordance with an embodiment of the present invention.

Additionally, as shown in FIG. 6 through FIG. 9, the latch 20 has a pivot joint 226 and at least one notch 228-1. The arm 224 is connected to a spring 229 (or other similar resilient element), while the pivot joint 226 is pivotally connected to a hinge (not shown) in the collar 208. The spring 229 exerts a force to maintain button 222 in a closed position where the notch 228-1 lies substantially flat as shown in FIG. 6 and FIG. 7.

Figure 8:
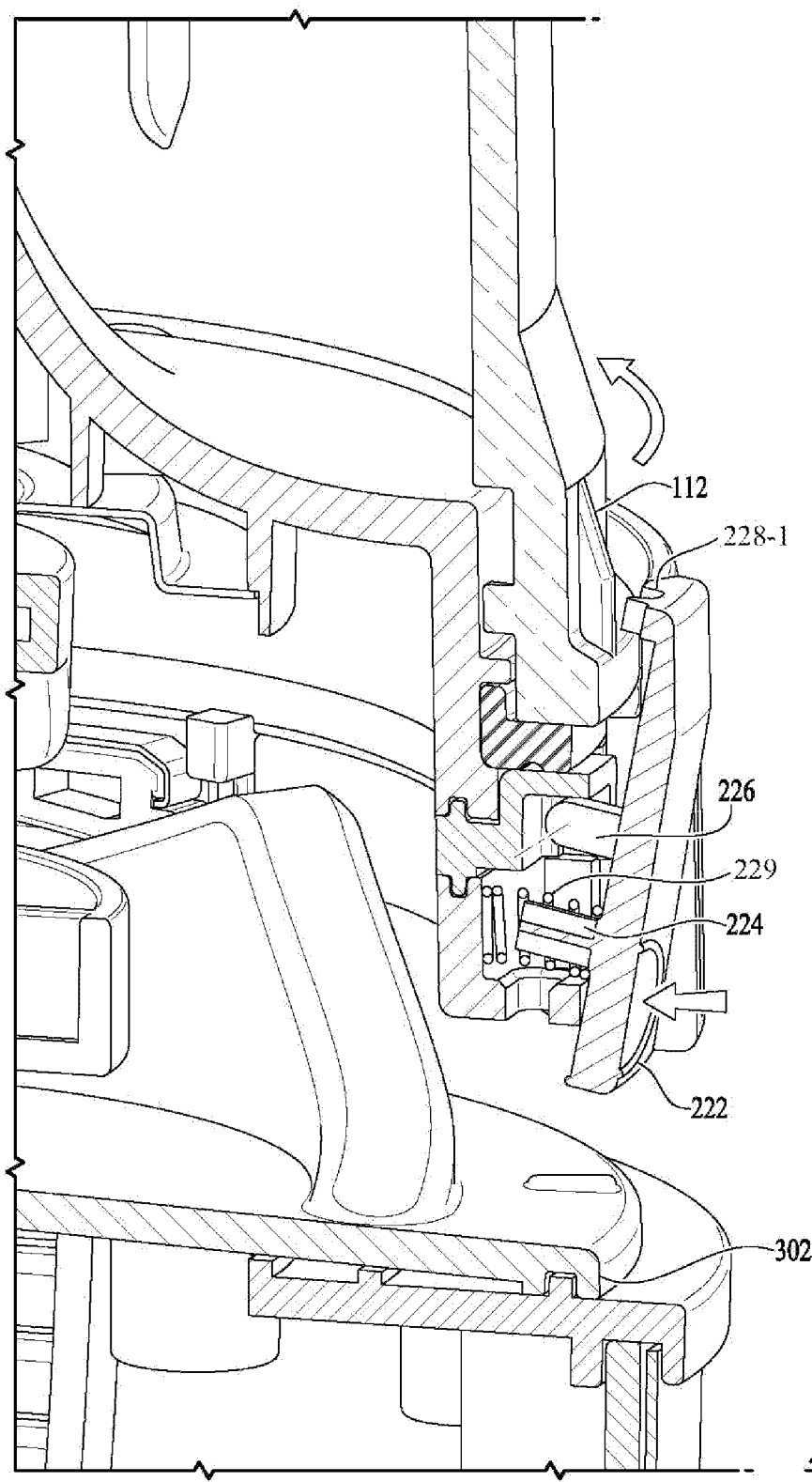
FIG. 8 is a cross section of the latch assembly as the button is depressed.

As shown in FIG. 8, when the button 222 is depressed, the latch 220 pivots at pivot joint 226 to lift the notch 228-1 into an open position. The notch 228-1 functions to engage a locking rib 112 on the container 10 to prevent the blade assembly 20 from being inadvertently detached from the container 10.

Figure 9:
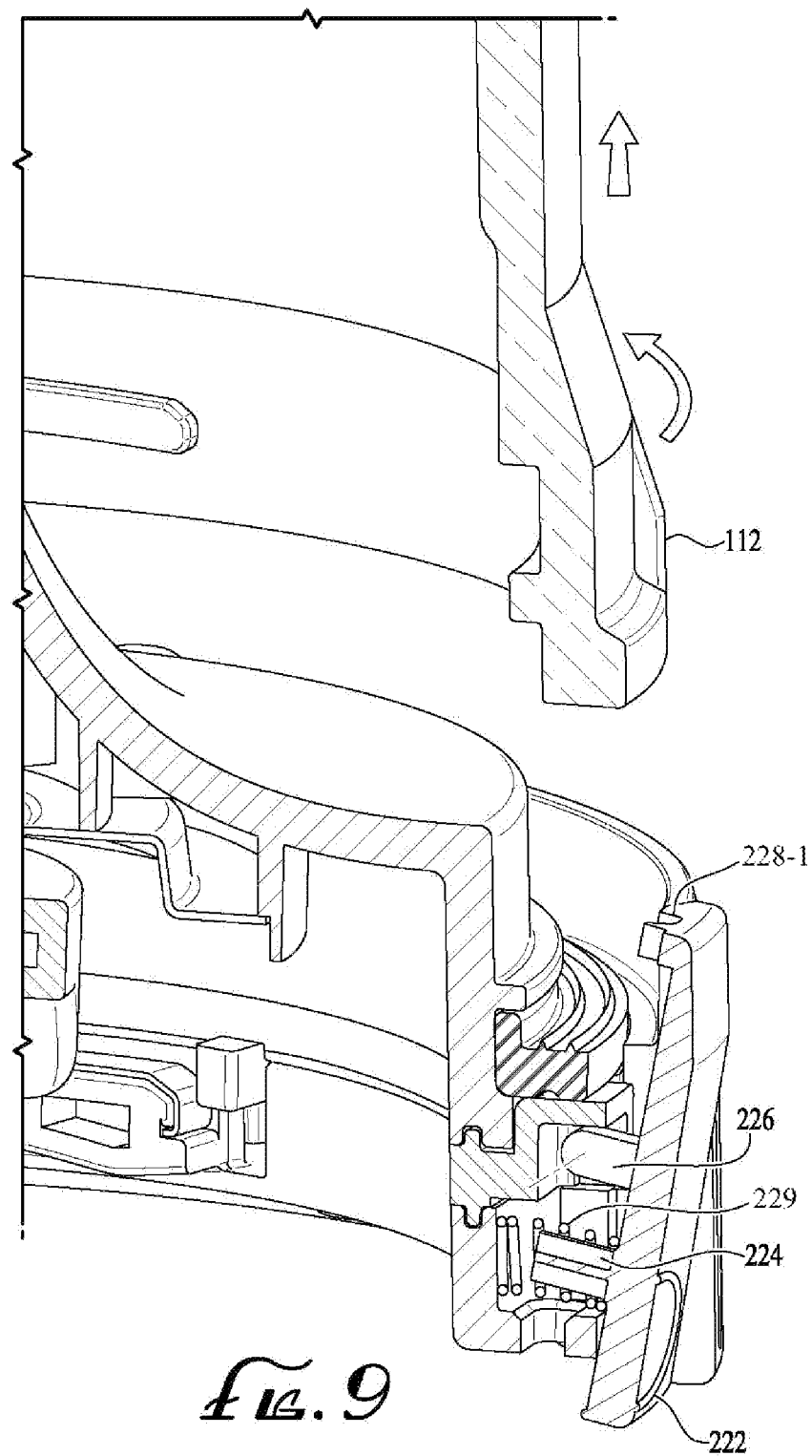
FIG. 9 is a cross section of the latch assembly as the button is depressed and the container is removed from the blade assembly.

The notch 228-1 has a profile as shown in FIG. 8 and FIG. 9. The notch 228-1 is chamfered on a forward side to allow the blade assembly 20 to be rotated in the forward direction. That is, because the notch 228-1 is chamfered on the forward side, it can pass over the locking ribs 112 on container 10 when the blade assembly 20 is rotated in the forward direction to attach the blade assembly 20 to the container 10. The notch 228-1 is not chamfered on the back side. Hence, once a locking rib 112 is engaged in the notch 228-1, the blade assembly 20 cannot be rotated in the reverse direction to detach the blade assembly 20 from the container 10.

The operation of the latch 220 is now described. The container 10 is attached to the blade assembly 20 by inserting the tongue protrusions 106 into the slots 214, and rotating the blade assembly 20 in a forward direction relative to the container 10 until the tongue protrusions 106 slide into the slots 214. Because the notch 228-1 is chamfered on the forward side, the notch 228-1 moves over the locking ribs 112 as the blade assembly 20 is rotated in the forward direction. The locking ribs 112 are located relative to the tongue protrusions 106 such that when the tongue protrusions 106 engage the slots 214 the notch 228-1 catches a locking rib 112. When the tongue protrusions 106 are secured in the slots 214 as desired, the locking rib 112 in the notch 228-1 prevents the blade assembly 20 from being rotated in the reverse direction. Since the blade assembly 20 cannot be rotated in the reverse direction, the blade assembly 20 cannot be detached from the container 10, thereby locking the blade assembly 20 to the container 10 to ensure a secure attachment.

As illustrated in FIGS. 8 and 9, to detach the blade assembly 20 from the container 10, it is necessary to lift the latch 220 to release the locking rib 112. This is done by depressing button 222 to pivot the notch 228-1ƒ into the open position so that it is no longer engaged with the locking rib 112, thus permitting the blade assembly 20 to be rotated in the reverse direction to detach the blade assembly 20 from the container 10.

In an embodiment as shown in FIG. 5, the latch 220 has a plurality of notches 228-1, 228-2, 228-3, which provides a ratcheting effect by allowing the blade assembly 20 to be locked to the container 10 at progressive degrees of rotation in the forward direction. In a preferred embodiment, the latch 220 has three notches 228-1, 228-2, and 228-3 arranged in parallel. When a tongue protrusion 106 begins to slide into a slot 214, the first notch 228-1 is engaged with a locking rib 112 at a point where only a segment of the tongue protrusion 106 is partially engaged with the slot 214. As the tongue protrusion 106 slides further into the slot 214, the locking rib 112 moves from the first notch 228-1 to the second notch 228-2 with and audible "clicking" sound. When the third notch 228-3 is engaged with the locking rib 112, the tongue protrusion 106 is fully engaged with the slot 214. In this way, notches 228-1, 228-2, and 228-3 correlate with a ratcheting of the engagement between the tongue protrusion 106 and the slot 214.

With blade assembly 20 securely attached to the container 10, the blade assembly 20 is mounted to a base 30. Referring back to FIG. 3, the base 30 has a motor (not shown) for driving a motor impeller 308. The blade assembly 20 is affixed to the base 30 by coupling the blade impeller 204 with the motor impeller 308 such that the motor operates to drive the blade impeller 204.

As shown in in FIGS. 6 through 8, the base 30 has a protrusion 302 located such that it contacts the latch 220 when the blade assembly 20 is mounted on the base 30. The protrusion 302 is located to obstruct the latch 220 from being depressed to release the locking rib 112. In this way, when the blade assembly 20 is mounted on the base 30, the protrusion 302 prevents the latch 220 from pivoting into the open position, thus preventing the latch 220 from being unlocked while the blade assembly 20 is mounted on the base 30. As a result, the container 10 is locked with the blade assembly 20 while the blade assembly 20 is mounted on the base 30.

The foregoing description of the embodiments of the present invention has been presented for the purpose of illustration and description. It is not intended to be exhaustive or to limit the invention to the precise form disclosed. Many modifications and variations are possible in light of the above teachings. The numerical values described in the description are only for illustration purpose and should not be understood as limiting the invention to the precise numbers. It is intended that the scope of the present invention not be limited by this detailed description, but by the claims and the equivalents to the claims appended hereto.

What is claimed is:

1. A blender comprising:
   a container with an open-end;
   a base configured to house a motor;
   an attachment mechanism having engaged and disengaged positions that attaches to said open-end of said container;
   wherein said attachment mechanism also removably attaches to said base;
   wherein, when said attachment mechanism is in said disengaged position, said container can be attached to the attachment mechanism;
   wherein, when said attachment mechanism is in said engaged position, said container cannot be removed from said attachment mechanism;
   wherein the user can removably secure said container to said attachment mechanism by rotating said container relative to said attachment mechanism;
   wherein said container is removably secured to said attachment mechanism by rotating said container relative to said attachment mechanism in a series of stages;
   wherein said series of stages comprises at least three stages where each stage further secures the attachment mechanism to said container;
   wherein said attachment mechanism makes an audible noise when said container is rotated relative to said attachment mechanism; and
   wherein the container can be rotated relative to said attachment mechanism in only one direction when the attachment mechanism is in the engaged position.

2. The blender according to claim 1, wherein said attachment mechanism is further comprised of:
   a locking rib; and
   at least one notch;
   wherein the attachment mechanism is in the engaged position when said locking rib is secured in said at least one notch.

3. The blender according to claim 2, wherein said attachment mechanism is further comprised of:
   at least one tongue protrusion;
   at least one slot;
   wherein said attachment mechanism is in the engaged position when said locking rib is secured in said at least one notch and said tongue protrusion is inserted into said slot.

4. The blender according to claim 1, further comprising:
   said base is further comprised of a motor for operating said blender when said container is mounted on said base, said base having a protrusion;
   wherein when said container is mounted on said base, said protrusion prevents said attachment mechanism from going into the disengaged position.

5. The blender according to claim 1 wherein said attachment mechanism is a blade assembly attachable to said open-end of said container; and,
   wherein said blade assembly and said container are assembled and further mounted on the base.

6. A blender comprising:
   a container having a rim defining an open end and a locking rib proximal to the rim;
   an attachment mechanism comprising a trench configured for seating the rim therein and a pivoting latch, the pivoting latch biased against the rim;
   the pivoting latch further comprising a notch configured to receive the locking rib, the notch chamfered to allow rotation of the locking rib into the notch with the locking rib disposed in the trench; and
   a base configured to house a motor for driving a blade in the container, wherein the attachment mechanism is releasably couplable to the base.

7. The blender of claim 6 wherein the container further comprises at least one tongue protrusion configured to engage at least one slot on the attachment mechanism to urge the rim against the trench.

8. The blender of claim 7 wherein the tongue protrusion extends circumferentially around the base.

9. The blender of claim 6 wherein the pivoting latch comprises a plurality of chamfered notches arranged in series.

10. The blender of claim 6 wherein the base comprises a protrusion configured to obstruct the pivoting latch, thereby preventing it from pivoting when the attachment mechanism is coupled to the base.

11. The blender of claim 6 wherein the attachment mechanism is incorporated into a blade assembly which includes the blade.

12. The blender of claim 11 wherein the base comprises an impeller for driving the blade assembly including the blade.

13. The blender of claim 6 wherein the pivoting latch comprises a button indicating a fulcrum point for releasing the locking rib from the notch.

* * * * *